Dec. 4, 1962 B. P. BAKER 3,067,279

COOLING MEANS FOR CONDUCTING PARTS

Filed March 31, 1958 2 Sheets-Sheet 1

Dec. 4, 1962 B. P. BAKER 3,067,279

COOLING MEANS FOR CONDUCTING PARTS

Filed March 31, 1958 2 Sheets-Sheet 2

United States Patent Office 3,067,279
Patented Dec. 4, 1962

3,067,279

COOLING MEANS FOR CONDUCTING PARTS

Benjamin P. Baker, Monroeville, Pa., assignor to Westinghouse Electric Corporation, East Pittsburgh, Pa., a corporation of Pennsylvania Filed Mar. 31, 1958, Ser. No. 725,279
1 Claim. (Cl. 174—18)

This invention relates to cooling means for cooling conducting parts and, more particularly, to means for utilizing a heat-dissipating liquid, which circulates, for effecting the cooling of current-carrying parts, such as contact structures, terminal bushings, and the like.

A general object of the present invention is to provide current-carrying parts, such as contact structures and terminal bushings, adapted for carrying relatively high-amperage currents, in which the cross-sectional areas of the parts may be reduced, and the current-carrying parts composed of suitable, more economical conducting material, such that the expense of the parts will be a minimum. As an example, the invention contemplates possible substitution of aluminum for copper. In accordance with the invention, the foregoing is brought about by utilizing a liquid cooling agent to effect the cooling of the current-carrying parts to increase their current-carrying capacity.

Another object of the present invention is to provide structure involving separable contact members, in which the heat generated in at lease one contact member is extracted therefrom by the employment of a suitable refrigerant or cooling agent in a circulating system.

Another object of the present invention is to provide an improved high-current-carrying capacity terminal bushing, suitable for carrying high-amperage currents, and employing a suitable liquid cooling agent to extract the generated heat from the interior, central portion of said terminal bushing to the outer end thereof. As a result, the conducting material, which may be employed for the terminal stud may be aluminum for example, or some other more economical material than copper; or, copper may be employed but with a smaller cross-sectional area, thereby reducing the expense of the bushing.

Still, a further object of the present invention is to associate with a terminal bushing an interiorly circulating refrigerant medium, so that the terminal bushing may be of relatively small dimensions, and the materials constituting said terminal bushing may be inexpensive.

Still, another object of the present invention is to provide an improved electrical device, in which the current-carrying capacity of the conducting parts may be increased by the use of a refrigerant medium, and the positioning of the device may be rendered immaterial by the employment of a suitable pumping device, which may be at high potential, and may derive its operating energy from the energy passing through the device.

Still, a further object of the present invention is to provide an improved tank-type circuit interrupter employing terminal bushings extending interiorly within a grounded tank structure, in which the stationary contact structures associated with the interior ends of the terminal bushings may be cooled, and hence rendered more effective, by the use of to circulating cooling medium circulating through the terminal bushings to carry heat to the external outer cooler ends of the terminal bushings.

Yet, a further object of the invention is to increase the current-carrying capacity of terminal bushings. Preferably, this is effected in conjunction with the employment of inexpensive conducting material utilized for the conducting parts of the terminal bushing.

Further objects and advantages will readily become apparent upon reading the following specification, taken in conjunction with the drawings, in which.

Figure 4:
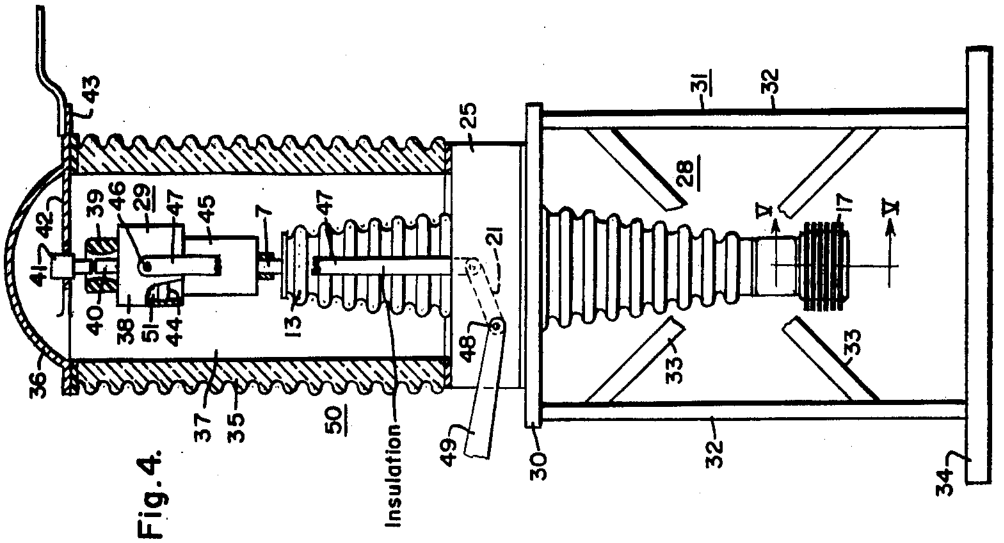
Figure 5:
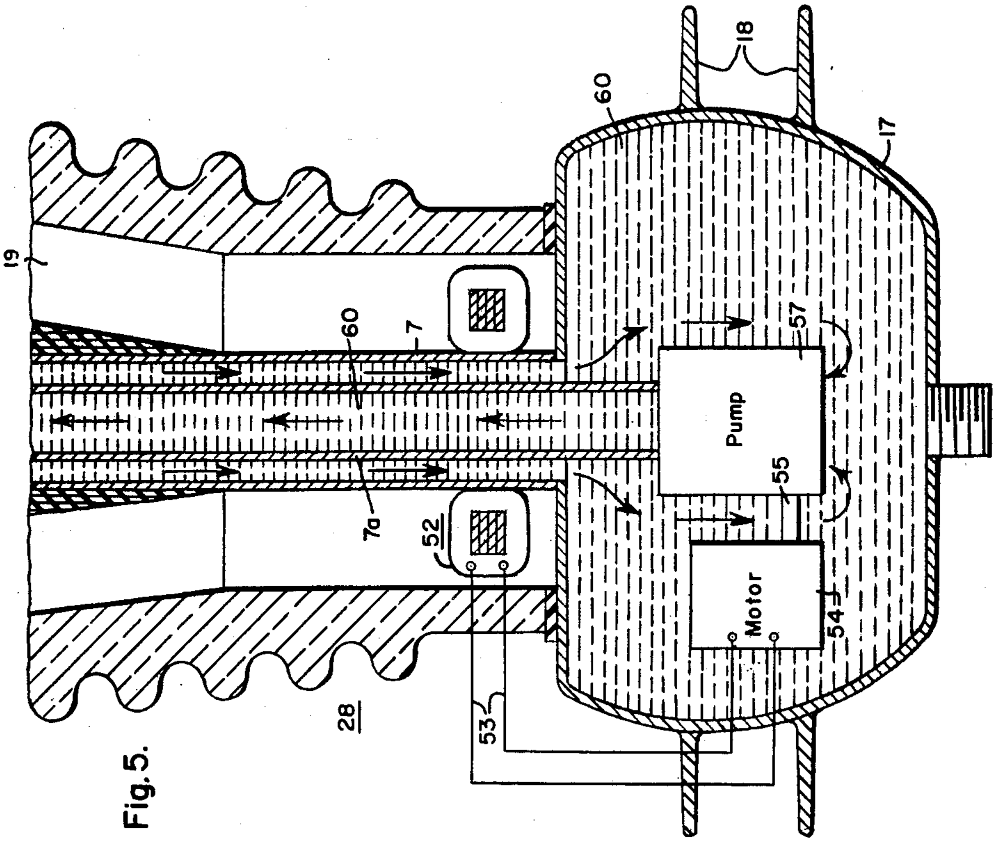

FIG. 4 is a side elevational view, partially in vertical section, and somewhat diagrammatic, illustrating how a terminal bushing employing the principles of the present invention, may be inverted, with the radiating cooling structure disposed downwardly, and associated with an interrupting structure disposed at the upper end of the terminal bushing; and, FIG. 5 is a considerably enlarged, vertical sectional view taken through the lower end of the terminal bushing of FIG. 4 substantially along the line V—V thereof.

As well known by those skilled in the art, in a standard 230 kv., 1600 ampere condenser bushing, the central current-carrying conductor tube is 4 inches in outside diameter and has an internal diameter of 3½ inches, with ¼ inch wall thickness, and may be 183 inches long. The heat generated in this conducting tube, disposed interiorly within the condenser bushing, at 1600 amperes, is equal to 8.6 watts per foot of tube length, or 131 watts total. This energy causes a maximum temperature rise at the center of the conductor tube of something less an 30° C. above ambient temperature.

Since the porcelain shells, interiorly disposed oil, and the condenser body, are all good thermal insulators, it is assumed that most of the heat generated at the center of the conducting tube is conducted along the tube to the ends of the terminal bushing, where it is dissipated into the air or the surrounding medium.

It is also to be observed that due to eddy currents, copper tube walls in excess of 0.45 inches thick, and aluminum tube walls in excess of 0.65 inch, do not contribute greatly to the current-carrying ability of the conductor tube, providing the heat cannot be conduced away along the tube by some circulating means.

It is, therefore, evident that to increase the current-carrying capacity of the conductor tube beyond a certain maximum, either a forced cooling system must be devised or the copper section increased regardless of efficiency. If an economical wall thickness is to be retained, the outside diameter of the tube must be increased, which consequently increases not only the copper cost, but in addition also the cost of the condenser body, porcelain shells and the current transformer. Decreasing the inside diameter of the conductor tube is very inefficient, in that it does not increase the current carrying capacity appreciably, however, the additional copper does assist in carrying the heat away from the center of the bushing conductor tube to the ends of the bushing, where it can be radiated. This approach to the problem is not economical, and the gain is very limited.

In the above-mentioned condenser bushing for 230 kv., 1600 amperes, the conductor tube cost is, at present, $78.00. If the inside diameter of the tube is decreased from 3½ inches to 3 inches, the wall thickness will remain satisfactory, but it will cost $122.00, and the bushing will be good for only 2000 amperes. Any further attempt to increase the current-carrying ability by decreasing the inside diameter of the tube will cause it to exceed the optimum wall thickness, and the gain will be limited and obtained at progressively greater expense.

In case it is desired to use aluminum tubing instead of copper tubing, the solution of the current-carrying problem, by adding additional conducting material, becomes very much more impractical. Assume, for example, a 4 inch outside diameter aluminum tube with the minimum economical inside diameter of 2¾ inches, its effective conductivity, compared to the 4 inch outside diameter by 3½ inches inside diameter copper tube, will be approximately 50%. Its cost will be $37.00, and its weight 65 pounds, as against the 174 pounds for the copper tube. If 2000 amperes were carried by this aluminum tube, 425 watts would be converted into heat, of which only 64 watts could be dissipated through the condenser body and carried along the tube to the ends thereof, without raising its temperature in excess of 30° C. above ambient. This would leave 360 watts to be removed by some other means.

According to one aspect of the present invention, it is proposed to use a completely enclosed and self-contained vapor-cooling system, in which some liquid, with a low boiling point and a high heat of vaporization, is used to carry the heat from its source near the center of the bushing conductor tube to a radiating surface at the end of the bushing. The following liquids possess the desired characteristics: ethyl ether, methyl formate, methyl or acetaldehyde, or propane. These liquids all have a high heat of vaporization and a boiling point between 20° C. and 35° C. at atmospheric pressure. By varying the applied pressure, the boiling point of the refrigerant liquid can be raised or lowered, as desired.

Ammonia, which is generally used as a refrigerant, is inexpensive and has a high heat of vaporization, but its boiling point is a −33° C. If it is desired to bring its boiling point up to a suitable value, such as 55° F., 100 p.s.i. absolute pressure would be required. In the event the temperature rose to 158° F., the enclosing parts of the bushing would have to withstand internal pressures in excess of 400 p.s.i. For some applications, this would be undesirable.

As volatile liquids suitable for evaporative cooling, one may use chloro-fluoro derivatives of ethane and methane for example trichloromonofluoromethane, known under the trade name of "Freon 11" and trichlorotrifluoroethane, known under the trade name "Freon 113." These and other possible refrigerant liquids are listed below, together with their boiling point at atmospheric pressure:

| Trade Name | Formula | B.P. at 1 Atm., ° C. |
|---|---|---|
| "Freon 11" | $CCl_3F$ | 23.7 |
| "Freon 21" | $CHCl_2F$ | 8.9 |
| "Freon 113" | $C_2Cl_3F_3$ | 47.7 |
| "Freon 114" | $C_2Cl_2F_4$ | 3.5 |

| Name: | B.P. at 1 atm., ° C. |
|---|---|
| Methylene chloride (dichloro methane), $CH_2Cl_2$ | 40.1. |
| Perfluoromethylcyclohexane | 76.3. |
| Perfluorotriethyl amine | 71. |
| Perfluorobicyclo-(2.2.1)-heptane | 70 (746 mm.). |

Preferably the pressure is so adjusted that the liquid will boil at a selected temperature, at which it is desired to operate the contact structure or the terminal bushing.

The heat-dissipating liquid will vaporize upon contact with the hot metallic parts, and the vapor bubbles will rise by their buoyancy to the outer cool end of the bushing structure, where condensation upon the cool walls of the radiating cap structure will take place. The liquid condensate will then return by gravity and be reused.

It will be observed that the evaporative cooling system of the present invention is arranged wholly within the terminal bushing structure and takes up very little more space than would be required in a conventional bushing. Preferably the volatile liquid has a freezing point well below any ambient temperature at which it is desired either to store the terminal bushing or to operate it in service. No auxiliary operating mechanism, pumps, or special heat exchangers are required.

An important fact to note is that since the refrigerant liquid is disposed within conducting structure, all at the same potential, such as the hollow conductor stud, the dielectric strength of the produced vapor is unimportant.

Preferably, the pressure employed with the selected volatile liquid is such that the boiling point of the volatile liquid, when in operating use, is within the temperature range from 40° C. to 70° C.

For certain applications involving higher ambient operating temperatures than 40° C., it would be desirable to use an operating pressure in conjunction with the volatile liquid such that the boiling point of the refrigerant liquid, when in operative use, is within the temperature range of 50° C. to 70° C. A preferred temperature range is 50° C. to 60° C.

Figure 1:
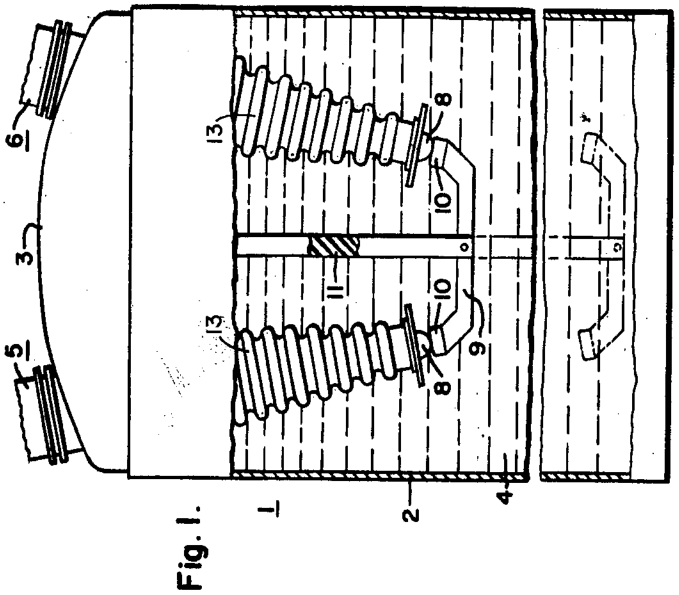
FIG. 1 is a side elevational view, partially in vertical section, of a tank-type, liquid-break circuit interrupter employing stationary contact structures associated with the interior ends of terminal bushings constructed according to the principles of the present invention, the contact structure being illustrated in the closed-circuit position.

With the foregoing principles in mind, some applications of the present invention will now be described. With reference to FIG. 1, there is illustrated a liquid-break type of circuit interrupter, generally designated by the reference numeral 1, and including a grounded tank 2 having a cover 3. Oil 4 is contained within the tank 2 for insulating and arc-extinguishing purposes.

Extending downwardly interiorly through the upper cover 3 is a pair of terminal bushings 5, 6, which incorporate principles of the present invention, as will be more fully described hereinafter.

Secured to the lower ends of the tubular conductor studs 7 (FIG. 2), extending through the terminal bushings 5, 6, is a stationary contact structure designated by the reference numeral 8. As shown, this relatively stationary contact structure 8 is shown as a button-type, stationary contact, but it is, of course, obvious that a more complicated stationary contact structure involving resilient fingers, or the like, could be used.

Electrically interconnecting the two stationary contacts 8 is a conducting bridging-bar 9 having a pair of movable button-type contacts 10 disposed at the outer extremities thereof. Serving to actuate the conducting crossbar 9 vertically, in a reciprocal manner, during the opening and closing operations of the interrupter 1, is an insulating lift rod 11, which may be moved by any conventional operating mechanism, which forms no part of the present invention.

As well known by those skilled in the art, during the opening operation of the interrupter 1, suitable operating mechanism is actuated to effect downward opening movement of the conducting crossbar 9. This will cause separiaton between the relatively stationary contacts 8 and the movable contacts 10 to establish a pair of serially related arcs therebetween. In practice, suitable adjacently disposed arc-extinguishing structures would be employed to more quickly bring about arc extinction, but for simplicity, and clarity of illustration, such normally used arc-extinguishing structures are eliminated from the drawing, and only plain-break contact structures, separable in oil, are pictured.

Due to unavoidable pitting and corrosion of the contacts 8, 10, a certain amount of resistance to current passage therebetween develops, and this, of course, generates heat at the contacts 8, 10 in the closed-circuit position of the interrupter 1. It is an additional purpose of the present invention to bring about the transmission of generated heat at the contact structures 8, 10 along the bushings 5, 6 to the outer extremities thereof, where such heat may be dissipated to the atmosphere.

Figure 2:
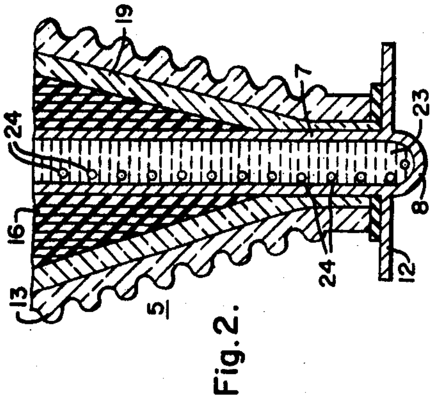
FIG. 2 is an enlarged, vertical sectional view through one of the terminal bushings employed in the circuit interrupter of FIG. 1.

With reference to FIG. 2, which illustrates, in enlarged fashion, a longitudinal vertical sectional view through the terminal bushing 5, it will be observed that the stationary contact 8 is integrally formed with a lower clamp plate 12 forming the lower end of the tubular bushing conductor stud 7 passing upwardly interiorly through the terminal bushing 5.

As shown, porcelain shells 13, 14 are employed, being clamped against an intermediately disposed cylindrical ground flange 15. As well known by those skilled in the art, the cylindrical ground flange 15 is utilized in conjunction with a suitable supporting flange structure to be clamped in proper position upon the upper cover 3 of the circuit interrupter 1.

Surrounding the tubular conductor stud 7 is an insulating tapered body 16, which serves to hold the voltage between the interiorly disposed conductor stud 7 and the encompassing grounded support flange 15. For relatively high-voltage application, generally condenser foils would be interspersed interiorly within the insulating body 16. In addition, suitable compression spring structure would be employed to ensure that the porcelain shells 13, 14 are maintained under compression against the centrally situated, grounded, supporting flange 15. For clarity of illustration, such normally used, compression-spring structure has been eliminated.

Disposed at the upper external extremity of the terminal bushing 5 is a radiating cap 17 having associated therewith radiating fins 18. Disposed interiorly within the tubular terminal bushing conductor stud 7 is a suitable refrigerant liquid, such as one of those mentioned above. Oil, or other suitable bushing dielectric fluid, may be employed in the spaces 19 between the porcelain shells and the condenser body 16. Such oil and the refrigerant liquid, of course, are separated from each other. It is preferable to provide a passage, or groove 20 along the cylindrical ground flange 15, so that communication of the oil between the spaces 19 at opposite ends of the terminal bushing 5 may be effected.

In operation, heat generated at the stationary contact 8, when the interrupter 1 is closed, will be absorbed by the refrigerant liquid 23 to cause the vaporization thereof, and the vapor bubbles 24 will move upwardly to the radiating cap structure 17, where heat will be given off to the atmosphere, thereby causing condensation of the vapor bubbles 24. The liquid condensate may then be reused. The heat generated within the central portion of the conductor tube 7, which usually has difficulty in being transmitted along the tube, will, by its contact with the refrigerant liquid 23, cause such heat to vaporize a part of the refrigerant liquid 23, thereby causing additional vapor bubbles 24 to be formed. These vapor bubbles will, as in the case of the previously mentioned vapor bubbles 24, rise upwardly due to their buoyancy to the outer, external cool end of the terminal bushing 5 to the radiating cap 17. Here the heat contained in the vapor will be given up to the surrounding atmosphere, and condensation of the vapor bubbles 24 will thus take place.

From the foregoing description, it will be apparent that the principles of the present invention may not only be applied to the interior cooling of terminal bushings 5, 6, but, in addition, the invention has applicability to the cooling of current-carrying parts of a circuit interrupter, such as the stationary contact structures 8 of FIGS. 1 and 2 of circuit interrupter 1.

Figure 3:
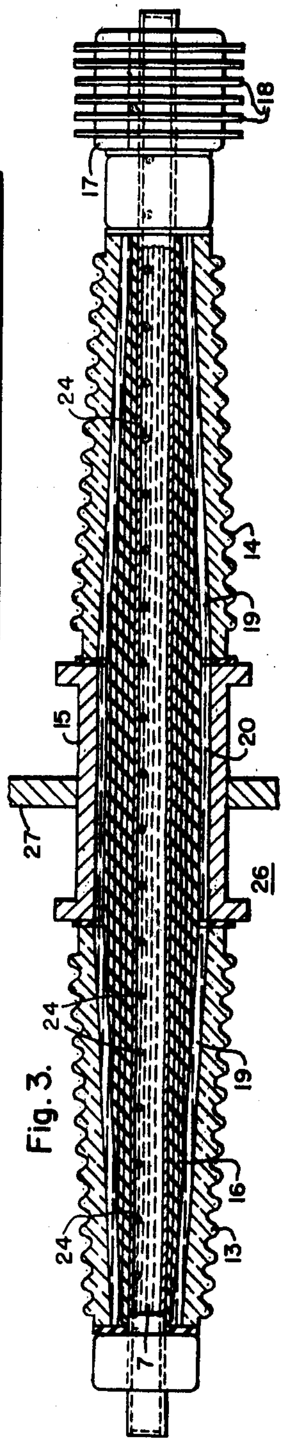
FIG. 3 illustrates a modified type of terminal bushing, in this particular instance one adapted for horizontal mounting, and extending through the side wall of a tank structure, the terminal bushing employing principles of the present invention.

FIG. 3 shows a modified type of terminal bushing 26, which is disposed horizontally, passing horizontally through a side wall 27 of a tank structure, not shown. Such a tank structure might enclose either a circuit interrupter or a transformer structure. As observed in FIG. 3, the bubbles 24 of vaporized refrigerant 23 will move to the right to the cooling fins 18 associated with the radiating cap 17, where they will condense. Thus, the invention is, of course, applicable to effect the efficient cooling of a terminal bushing of the type which carries current within a tank structure, but has no stationary contact structure 8 associated therewith, as was the case in FIGS. 1 and 2.

Calculations indicate that a 230 kv., 2000 ampere bushing with a 4 inch outside diameter by 2¾ inch inside diameter aluminum tube will meet temperature requirements if, approximately 8 square feet of finned, radiating surface is provided associated with the radiator cap 17.

For certain applications, it may be necessary to dispose the terminal bushing in such a manner that the radiating cap 17 may be disposed lower than the bushing tube 7. FIG. 4 illustrates such a possible application. With reference to this figure, which somewhat diagrammatically illustrates the use of a modified type of terminal bushing 28, associated with an interrupting structure 29 disposed at the upper end thereof, it will be observed that the terminal bushing 28 is supported, adjacent its center, by a support plate 30. The support plate 30 is supported at the upper end of an angle-iron framework, generally designated by the reference numeral 31, and including a plurality of angle-iron uprights 32 and diagonally extending cross-braces 33, preferably formed from angle-iron material. The framework 31 is supported upon a base 34.

Extending upwardly from the support plate 30 is a mechanism housing 25, surmounted by a cylindrical porcelain shell 35, having a closure cap 36 disposed at its upper end. A suitable arc-extinguishing gas 37, such as sulfur hexafluoride ($SF_6$), is disposed interiorly within the casing 35. The interrupting structure 29 may be of the type set out in U.S. patent application Serial No. 629,604, filed December 20, 1956, now United States Patent No. 2,866,045, issued December 23, 1958, to Winthrop M. Leeds, and assigned to the assignee of the instant application. Generally, such an interrupting structure 29 includes a movable operating cylinder 38, carrying an orifice 39 of insulating material therewith. Disposed interiorly within the orifice 39 is a movable contact 40, which makes contacting engagement with a relatively stationary contact 41, the latter being electrically connected through a spider plate 42 to a line-terminal lug 43. A stationary piston 44 is disposed at the upper end of a stationary cylinder 45, which is fixedly threadedly secured into position to the upper end of the conductor tube 7. As before, the conductor tube 7 extends downwardly interiorly within the terminal bushing 28.

Disposed at diametrically opposite sides of the operating cylinder 38 is a pair of pivot pins 46, which are linked to insulating operating rods 47, the lower ends of which are pivotally connected to interiorly disposed crank-arms 21, as set out in the aforesaid Leeds patent. The interiorly disposed crank-arms 21, are actuated by a laterally extending operating shaft 48. The operating shaft 48 extends out of the mechanism housing 25 in a gas-tight manner, and has secured thereto externally of the housing 25 a crank-arm 49, which may be actuated in any conventional manner.

Briefly, the opening operation of the single-bushing circuit interrupter 50 is as follows: the external crank-arm 49 is rotated by any suitable mechanism, and this, in turn, effects longitudinal downward opening movement of the pair of insulating operating rods 47, which straddle the upper porcelain shell 13. The operating rods 47, being connected to the actuating pins 46, effect downward movement of the operating cylinder 38 over the interiorly disposed stationary cylinder 45, compressing the sulfur hexafluoride gas within the region 51. This compressed gas will pass through the insulating orifice 39 effecting extinction of the arc, which is established between the movable and stationary contacts 40, 41. Arc extinction rapidly occurs by the blast of gas forced adjacent the arc.

During the closing operation of the interrupter 50, the external crank-arm 49 is rotated in the opposite direction to effect upward closing movement of the pair of insulating operating rods 47. This will effect upward closing travel of the operating cylinder 38, which carries the movable contact 40 therewith. This closing movement continues until the movable contact 40 engages the stationary contact 41, at which time the circuit is closed through the interrupter 50.

It will be noted that with the interrupting structure 50, the radiating cap 17 is disposed at a lower level than the interiorly disposed tubular bushing stud 7. Consequently, it is desirable to utilize a circulating pump to force cooling liquid, such as water, alcohol or ethylene glycol or mixtures of these downwardly toward the radiating cap structure 17. With reference to FIG. 5, it will be noted that a current transformer 52 is employed, with the secondary winding leads 53 connected to a pump motor 54. The motor 54 has a rotating shaft 55, which serves to actuate a pump 57 to force a cooling liquid 60, such as water, ethylene glycol, alcohol or mixtures upwardly through an interiorly disposed return tube 7*a*. The upper end of the return tube 7*a* communicates with the interior of the outer hollow conductor tube 7. It is obvious that the pump 57 is at a high potential, as is the current transformer 52, but since this pumping structure is isolated from ground potential, this fact is unimportant.

From the foregoing structure, as illustrated in FIGS. 4 and 5, it will be apparent that even though the radiating cap structure 17 is disposed in a lowered position, still by the use of suitable pumping equipment, the circulation of a cooling liquid 60, such as water, ethylene glycol or alcohol will be ensured, so that transmission of the interiorly generated heat to the surrounding atmosphere through the radiating cap 17 and radiating fins 18 may take place.

From the foregoing description of the invention, it will be apparent that use of relatively inexpensive conducting materials, such as aluminum, may take the place of a more expensive conducting material, such as copper, in terminal-bushing structures by the use of a suitable cooling liquid disposed within the bushing. Where the radiating cap structure is disposed on a higher level than the terminal bushing conductor tube, no pumping equipment need be employed, and, as illustrated in FIG. 2, the structure is very simple. Cooling occurs by evaporation of the coolant liquid, and the vapor bubbles 24 rise, due to their low density, to the upper cool cap structure, where condensation of the vapor takes place. Where, however, the particular application requires the disposition of the radiating cap 17 at a lower level than the conducting tube, still the invention may be employed in conjunction with suitable circulating pump equipment, the latter, for example, being disposed at high potential, and effecting the circulation of a suitable cooling liquid 60, such as water, ethylene glycol, or alcohol and mixtures thereof for example.

Although there have been shown and described specific structures, it is to be clearly understood that the same were merely for the purpose of illustration, and that changes and modifications may readily be made therein by those skilled in the art, without departing from the spirit and scope of the invention.

I claim as my invention:

The combination with a vapor-cooled terminal bushing for a tank-type circuit interrupter of a stationary hollow contact fixedly secured to the interior end of the vapor-cooled terminal bushing and a radiating cap disposed at the other end thereof, said stationary hollow contact having an arcing surface on the lower side thereof, a movable contact cooperable with said arcing surface to establish arcing, only a relatively thin skin of metal being provided between the arcing surface and the interior portion of the hollow contact, a tank having a cover, said vapor-cooled terminal bushing being mounted generally vertically through said cover with the upper end thereof including said radiating cap exposed to the atmosphere, said terminal bushing having a hollow terminal stud in alignment with the radiating cap and of a width at least as great as the lateral width of said hollow stationary contact, the cross-sectional area of said radiating cap being comparable with the cross-sectional area of the midportion of the terminal bushing, a volatile liquid refrigerant contained within said hollow terminal stud and also within said hollow stationary contact so that the refrigerant may readily extract heat from the contact and become vaporized, whereby the vaporized refrigerant will be cooled and be condensed within the radiating cap protruding outwardly into the ambient atmosphere.

References Cited in the file of this patent

UNITED STATES PATENTS

| | | |
|---|---|---|
| 1,045,288 | Hewlett | Nov. 26, 1912 |
| 1,129,466 | Fortescue | Feb. 23, 1915 |
| 1,451,969 | Steinberger | Apr. 17, 1923 |
| 1,481,780 | Burnham | Jan. 22, 1924 |
| 1,567,201 | Steinberger | Dec. 29, 1925 |
| 1,777,071 | Burnham | Sept. 30, 1930 |
| 1,788,380 | Burnham | Jan. 13, 1931 |
| 1,811,887 | Jansson | June 30, 1931 |
| 1,878,094 | Atkinson | Sept. 20, 1932 |
| 1,905,751 | Rankin | Apr. 25, 1933 |
| 1,953,216 | Elsey | Apr. 3, 1934 |
| 1,959,338 | Bennett | May 22, 1934 |
| 1,961,475 | Clerc | June 5, 1934 |
| 2,083,611 | Marshall | June 15, 1937 |
| 2,160,660 | Hobart | May 30, 1939 |
| 2,292,031 | Arnold | Aug. 4, 1942 |
| 2,742,582 | Bohn et al. | Apr. 17, 1956 |
| 2,953,629 | Lapp | Sept. 20, 1960 |

FOREIGN PATENTS

| | | |
|---|---|---|
| 406,999 | Great Britain | Feb. 28, 1934 |
| 443,017 | Great Britain | Feb. 18, 1936 |